United States Patent
Gonzales et al.

(10) Patent No.: US 9,631,765 B2
(45) Date of Patent: Apr. 25, 2017

(54) SYSTEMS AND METHODS FOR DUCT PROTECTION OF A VEHICLE

(71) Applicant: The Boeing Company, Seal Beach, CA (US)

(72) Inventors: Michael D. Gonzales, Ravensdale, WA (US); Michael Strasik, Sammamish, WA (US); John R. Hull, Sammamish, WA (US)

(73) Assignee: The Boeing Company, Chicago, IL (US)

(*) Notice: Subject to any disclaimer, the term of this patent is extended or adjusted under 35 U.S.C. 154(b) by 191 days.

(21) Appl. No.: 13/961,162

(22) Filed: Aug. 7, 2013

(65) Prior Publication Data

US 2015/0040994 A1   Feb. 12, 2015

(51) Int. Cl.
*F16L 57/00* (2006.01)
*F16L 55/00* (2006.01)

(52) U.S. Cl.
CPC ............... *F16L 57/00* (2013.01); *F16L 55/00* (2013.01); *F16L 2201/30* (2013.01); *Y10T 137/0441* (2015.04); *Y10T 137/5762* (2015.04)

(58) Field of Classification Search
CPC ... F16L 57/00; F16L 2201/20; F16L 2201/30; Y10T 137/5762
USPC .......................................................... 285/13
See application file for complete search history.

(56) References Cited

U.S. PATENT DOCUMENTS

| | | | |
|---|---|---|---|
| 3,948,295 A | 4/1976 | Lemont et al. | |
| 4,275,769 A | 6/1981 | Cooke | |
| 4,335,905 A * | 6/1982 | Bac | 285/20 |
| 4,848,409 A * | 7/1989 | Jahnke, Jr. | 138/110 |
| 4,942,903 A | 7/1990 | Jacobsen | |
| 5,137,230 A * | 8/1992 | Coffinberry | 244/118.5 |
| 5,713,388 A * | 2/1998 | Brewer | G01D 11/24 137/377 |
| 5,828,003 A | 10/1998 | Thomeer et al. | |
| 6,062,610 A | 5/2000 | Andersson | |
| 6,627,561 B1 | 9/2003 | Wulliman et al. | |
| 6,848,720 B2 * | 2/2005 | Carns et al. | 285/123.15 |
| 7,493,911 B2 * | 2/2009 | Carns | F16K 1/22 137/1 |
| 7,658,983 B2 | 2/2010 | Mormont et al. | |
| 8,387,748 B2 | 3/2013 | Richardson, III et al. | |

(Continued)

FOREIGN PATENT DOCUMENTS

CN     201531711 U    7/2010
SU     1080237 A1     3/1984

OTHER PUBLICATIONS

Great Britain Search Report for related application GB1413705.3 dated Jan. 20, 2015, 4 pp.

(Continued)

*Primary Examiner* — Kevin Murphy
(74) *Attorney, Agent, or Firm* — Armstrong Teasdale LLP

(57) ABSTRACT

Methods and systems for duct protection of a vehicle are provided. The methods and systems provided include an apparatus for directing flow discharged from a facture in a duct. The apparatus includes a ballistic containment layer, an air containment layer substantially surrounding the ballistic containment layer, and a vent defined in the ballistic containment layer and the air containment layer. The vent is configured to direct a flow discharged from the duct fracture.

20 Claims, 4 Drawing Sheets

(56) References Cited

U.S. PATENT DOCUMENTS

| | | | |
|---|---|---|---|
| 8,454,056 B2 | 6/2013 | Fernandes | |
| 2005/0052018 A1 | 3/2005 | Pichotta | |
| 2006/0284018 A1* | 12/2006 | Carns et al. | 244/135 A |
| 2009/0102187 A1* | 4/2009 | Carns et al. | 285/123.15 |
| 2010/0037974 A1* | 2/2010 | Fernandes et al. | 138/141 |
| 2010/0084035 A1* | 4/2010 | Binet | F16L 11/083 138/104 |
| 2010/0147446 A1* | 6/2010 | Ciolczyk et al. | 156/191 |
| 2012/0018014 A1* | 1/2012 | Fernandes et al. | 137/561 A |
| 2013/0263963 A1 | 10/2013 | Kalman et al. | |

OTHER PUBLICATIONS

Great Britain Examination Report for related application GB1413705.3 dated Jul. 9, 2015; 2 pp.
U.S. Appl. No. 14/448,905, filed Jul. 31, 2014.
U.S. Appl. No. 14/657,563, filed Mar. 13, 2015.
Great Britain Examination Report for related application GB1413705.3 dated Oct. 12, 2015; 2 pp.

* cited by examiner

SYSTEMS AND METHODS FOR DUCT PROTECTION OF A VEHICLE

BACKGROUND

The field of the disclosure relates generally to duct protection, and more specifically, to methods and systems for duct protection of a vehicle.

Generally, vehicles include ducts for channeling a flow of hot air, gas, or water through the vehicle. These ducts are often positioned near structures (e.g., fuel tanks) that are sensitive to heat and/or moisture. If a rupture or burst in a duct occurs near such sensitive structures, the flow escaping from a fracture in the duct can cause the structure to malfunction and cause irreparable harm to the vehicle. In some known systems, a structural shielding system is added as a physical barrier to separate and protect sensitive structures from ducts. However, a structural shielding system can be cumbersome, heavy, and costly to manufacture and maintain.

BRIEF DESCRIPTION

In one aspect, an apparatus for directing flow discharged from a facture in a duct is provided. The apparatus includes a ballistic containment layer, an air containment layer substantially surrounding the ballistic containment layer, and a vent defined in the ballistic containment layer and the air containment layer. The vent is configured to direct a flow discharged from the duct fracture.

In another aspect, a duct protection system for a vehicle is provided. The duct protection system includes a duct configured to channel flow through the vehicle, and a duct burst apparatus. The duct burst apparatus includes a ballistic containment layer, an air containment layer substantially surrounding the ballistic containment layer, and a vent defined in the ballistic containment layer and the air containment layer. The vent is configured to direct a flow discharged from the duct fracture.

In yet another aspect, a method of fabricating an apparatus for directing flow discharged from a facture in a duct is provided. The method includes forming a ballistic containment layer, forming an air containment layer that substantially surrounds the ballistic containment layer, and defining a vent in the ballistic containment layer and the air containment layer, the vent configured to direct a flow discharged from the duct fracture.

The features, functions, and advantages that have been discussed can be achieved independently in various embodiments or may be combined in yet other embodiments, further details of which can be seen with reference to the following description and drawings.

DETAILED DESCRIPTION

The systems and methods described herein enable duct protection of a vehicle. As used herein, the term "vehicle" refers to any mobile machine capable of transporting passengers, cargo, and/or equipment. As used herein "vehicle" includes, but is not limited to only including, automobiles (e.g., car, bus, and truck), watercraft, sailcraft, aircraft, and spacecraft.

Figure 1:
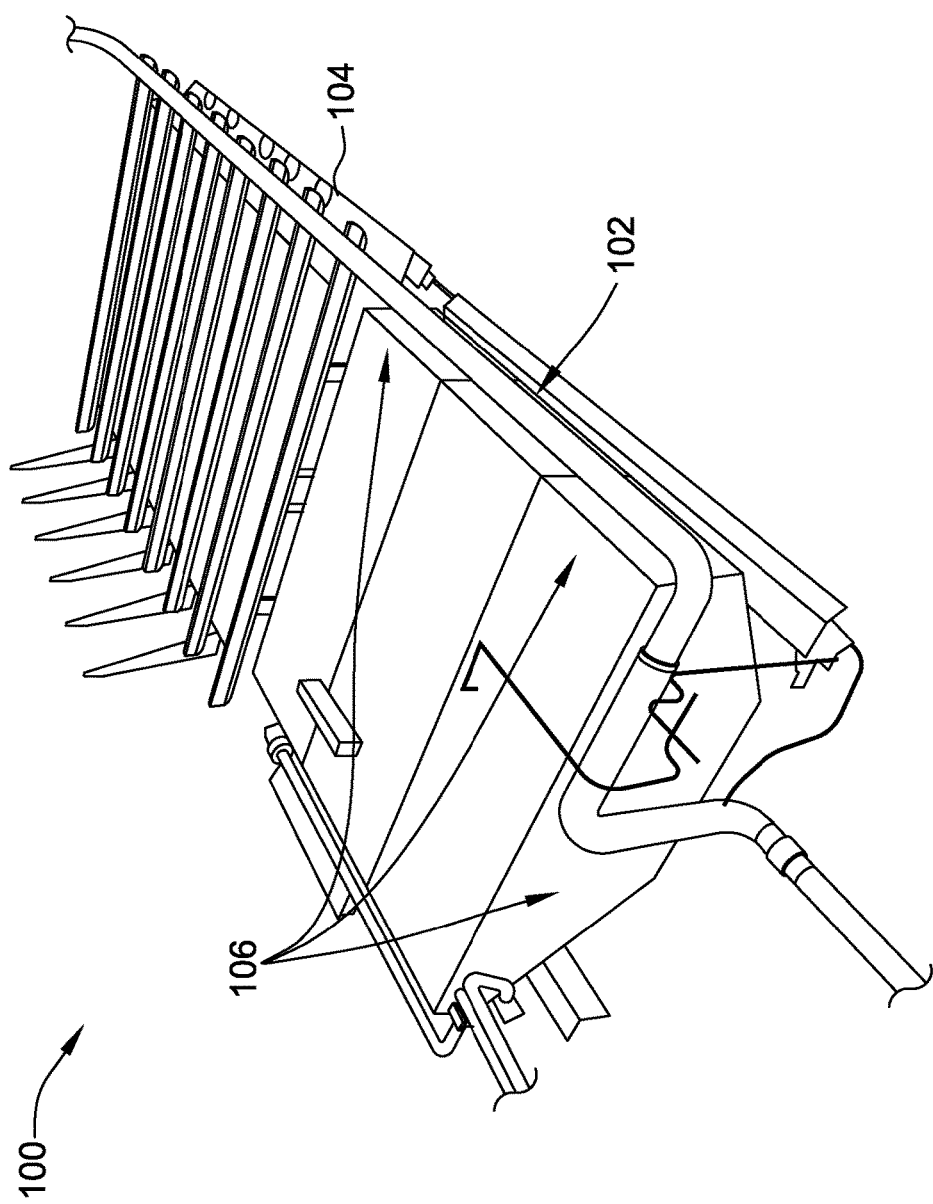
FIG. 1 is a perspective view of an exemplary duct system of a vehicle.

FIG. 1 is a perspective view of an exemplary duct system 100 of a vehicle. In the exemplary embodiment duct system 100 is used with an aircraft, which may include, but is not limited to only including, airplanes, unmanned aerial vehicles (UAVs), gliders, helicopters, and/or any other object that travels through airspace. Duct system 100 includes a duct 102 coupled to a support structure 104 of the aircraft. In the exemplary embodiment, duct 102 is positioned proximate fuel tanks 106.

In the exemplary embodiment, duct 102 is an auxiliary power unit (APU) air duct for channeling bleed air from the APU. In some embodiments, duct 102 is fabricated from a titanium and is 7 inches in diameter. Alternatively, duct 102 can be any duct, having any size, and formed from any material (e.g., stainless steel or nickel alloy) that is capable of channeling air, gas, and/or liquid through a vehicle. In some embodiments, duct 102 is configured to channel at least one of a high pressure flow, a low pressure flow, a high temperature flow, and a low temperature flow.

Figure 2:
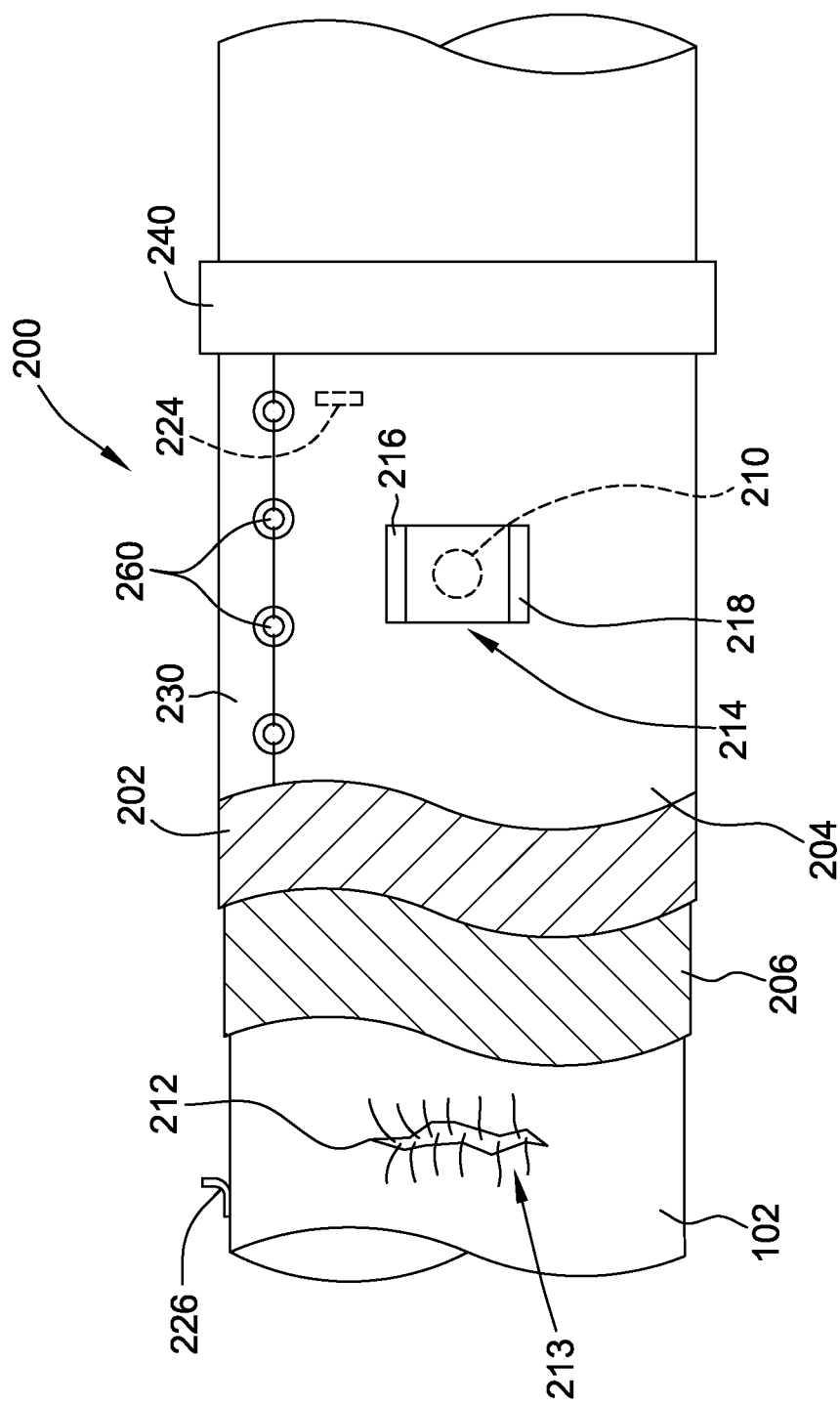
FIG. 2 is cutaway view of a duct burst apparatus that may be used with the duct system shown in FIG. 1.
Figure 3:
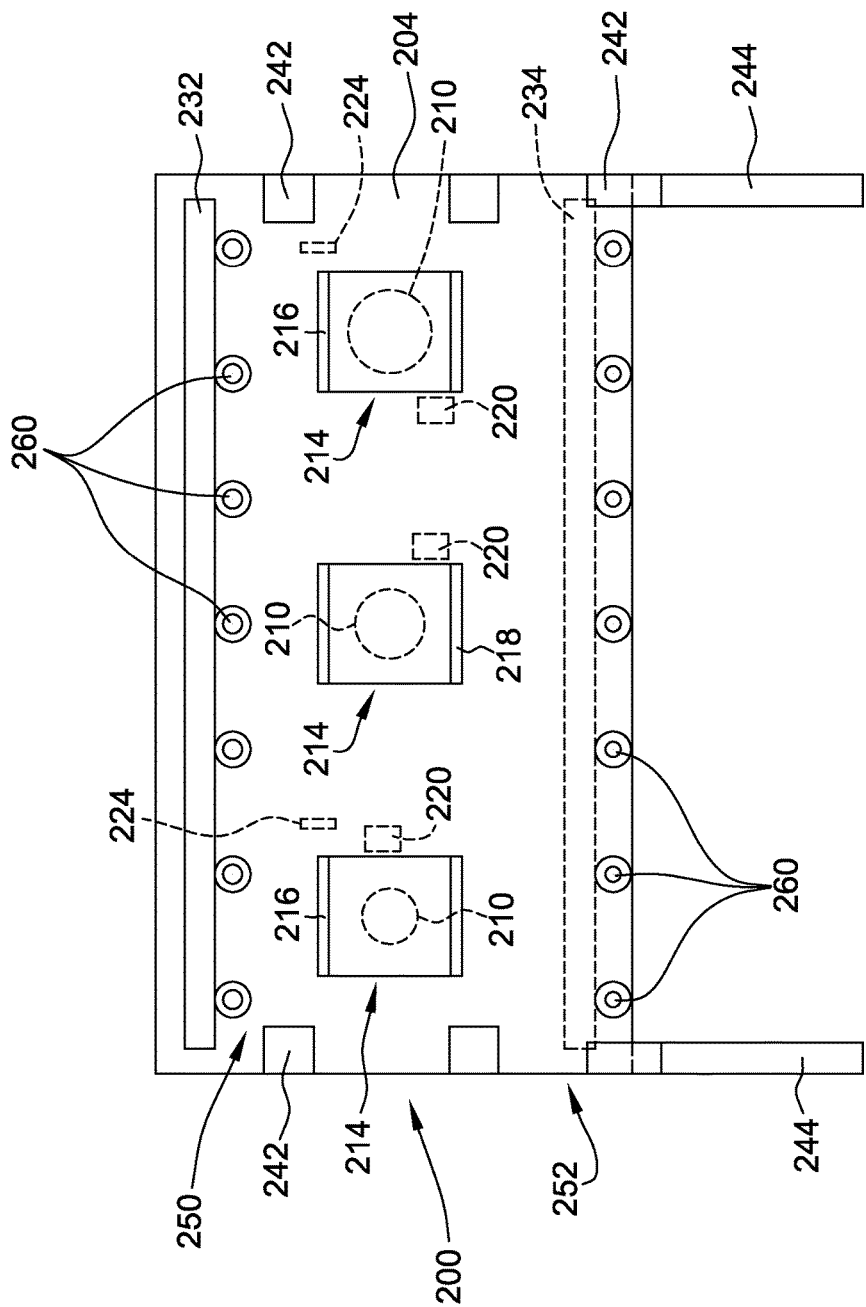
FIG. 3 is a plan view of the duct burst apparatus shown in FIG. 2.

FIG. 2 is cutaway view of a duct burst apparatus 200 that may be used with duct system 100 (shown in FIG. 1) and FIG. 3 is a plan view of duct burst apparatus 200. Duct burst apparatus 200 is configured to substantially surround duct 102, retain debris, and protect surrounding structures resulting from a burst or explosion occurring within duct 102. Duct burst apparatus 200 is also configured to channel flow discharged from a fracture within duct 102 resulting from the duct burst.

In the exemplary embodiment, duct burst apparatus 200 includes a ballistic containment layer 202 and an air containment layer 204 substantially surrounding ballistic containment layer 202. In one embodiment, ballistic containment layer 202 substantially surrounds an insulation layer 206 that is configured to contact duct 102. Alternatively, insulation layer 206 is integrated within at least one of ballistic containment layer 202 and air containment layer 204. In some embodiments, at least one of ballistic containment layer 202 and air containment layer 204 function as an insulation layer 206.

In the exemplary embodiment, ballistic containment layer 202 is formed from a para-aramid fiberous material capable of absorbing debris and an impact generated from an explosion or burst within duct 102. Ballistic containment layer 202 is formed having a thickness in the range of $\frac{1}{16}$ inch to $\frac{1}{8}$ inch. Alternatively, ballistic containment layer 202 can be formed from any material including, but not limited to a ceramic, braided and/or weaved fiber of graphite, glass, or carbon fiber having any thickness that facilitates absorbing debris and an impact generated from an explosion or burst within duct 102. Insulation layer 206 is formed from fiberglass ceramic felt and has a thickness in the range of $\frac{1}{8}$ inch to $\frac{1}{2}$ inch. Alternatively insulation layer 206 can be formed from any material having any thickness that facilitates insulating duct 102.

In the exemplary embodiment, air containment layer 204 is formed from a lightweight non-porous material capable of sealing and/or retaining air, gas, or liquids. In some embodiments air containment layer 204 is formed from one of a silicone coated glass cloth and a substantially flexible polymer coated fabric and has a thickness in the range of $\frac{1}{8}$ inch to $\frac{1}{32}$ inch. Alternatively air containment layer 204 can be formed from any material having any thickness that facilitates substantially containing and/or sealing flow from duct 102. In the exemplary embodiment, each of layers 202, 204, and 206 are configured to withstand temperatures up to 500° F. Alternatively, layers 202, 204, and 206 are configured to withstand any temperature of flow channeled through duct system 100.

Fabricated in each layer 202, 204, and 206 is a vent 210 configured to direct a flow discharged from a fracture 212 sustained within duct 102. Vent 210 is positioned on apparatus 200 and within layers 202, 204, and 206 such that flow 213 (e.g., air, gas, or liquid) is channeled through at least one of apparatus 200 and a cavity formed between apparatus 200 and duct 102. Flow 213 is exhausted from vent 210 at a predetermined location. Positioning of vent 210 enables apparatus 200 to protect structures from flow 213 exiting fracture 212. Although FIG. 3 illustrates apparatus 200 with three vents 210, any number of vents can be used throughout apparatus 200.

In the exemplary embodiment, a vent cover 214 is secured over vent 210 and fabricated from a material used to fabricate air containment layer 204. Vent cover 214 is coupled to air containment layer 204 by a first securement portion 216 and a second securement portion 218. First securement portion 216 fixedly couples vent cover 214 to air containment layer 204 by stitching. Alternatively, portion 216 can be coupled to layer 204 in any manner that fixedly couples vent cover 214 to layer 204 including, but not limited to, ultrasonic welding and mechanical fasteners to substantially form a hinge. In one embodiment, vent cover 214 is fixedly coupled to each layer of apparatus 200. Second securement portion 218 releasably couples vent cover 214 to air containment layer 204 by hook and loop fasteners. Alternatively, portion 218 can be coupled to layer 204 in any manner that releasably couples vent cover 214 to layer 204.

In operation, flow 213 exiting fracture 212 is channeled through apparatus 200 and creates pressure on vent cover 214 until the pressure is strong enough to release portion 218 from layer 204 to enable flow 213 to exhaust from vent 210. As such, first securement portion 216 is substantially flexible to enable second securement portion 218 to release from layer 204, while first securement portion 216 remains coupled to layer 204. Additionally, second securement portion 218 can be configured to couple to layer 204 such that a predetermined pressure is needed to release portion 218 from layer 204. For example, cover 214 may be releasably coupled to layer 204 such that 170 pounds per square inch (psi) are needed to release portion 218 from layer 204. Alternatively, cover 214 can be configured to releasably couple to layer 204 by any pressure.

In some embodiments, a sensor 220 is positioned adjacent vent 210. In one embodiment, sensor 220 is position within vent cover 214. In the exemplary embodiment, sensor 220 is a thermal sensor. Alternatively, sensor 220 can be any sensor used to detect flow or heat characteristics including, but not limited to, a chemical sensor, flow sensor, and strain gauge. In some embodiments, sensor 220 is coupled to a display unit (not shown) such that a presentation of data collected by sensor 220 can be quickly viewed. Alternatively, sensor 220 is coupled to a remote computing device (not shown) configured to store, analyze, present, and/or transmit data collected by sensor 220. It should be noted that sensor 220 can be coupled to a display unit and/or a remote computing device via a wired or wireless signal. In the exemplary embodiment, apparatus 200 is configured to direct flow 213 discharged from fracture 212 towards sensor 220 such that flow characteristics of flow 213 may be presented to a user.

Apparatus 200 includes an anti-rotation feature 224 configured to substantially prevent apparatus 200 from rotating around duct 102 as flow 213 is discharged from fracture 212. Feature 224 is formed within layers 202, 204, and 206 to receive and retain a tab 226 extending from and coupled to duct 102. In the exemplary embodiment, apparatus 200 includes a lengthwise fastener system 230 and a widthwise fastener system 240. As used herein, fastener systems 230 and 240 may refer to a self-supporting fastener. It should be noted that feature 224 can be any feature that secures apparatus 200 to duct 102 to substantially prevent rotation of apparatus 200 including, but not limited to hose clamps.

Lengthwise fastener system 230 includes a first lengthwise fastener 232 coupled to an outer side 250 (e.g., air containment layer 204) of apparatus 200 and a second lengthwise fastener 234 coupled to an inner side 252 (e.g., ballistic containment layer 202 and/or insulation layer 206). As apparatus 200 is positioned around duct 102, first fastener 232 is configured to substantially mate with second fastener 234 to secure apparatus 200 to duct 102 to substantially seal flow 213 within apparatus 200. Similarly, widthwise fastener system 240 includes at least one first widthwise fastener 242 and a second widthwise fastener 244 coupled to outer side 250 of apparatus 200. First fastener 242 is configured to substantially mate with second fastener 244. First fastener 242 and second fastener 244 are coupled to outer side 250 substantially proximate widthwise edges of apparatus 200 to substantially seal flow 213 within apparatus 200. In the exemplary embodiment, fastener systems 230 and 240 include a self-supporting fastener such as, but not limited to, a hook and loop fastener. For example, first fasteners 232 and 242 can include hook fasteners and second fasteners 234 and 244 can include loop fasteners such that fastener 232 mates with fastener 234 and fastener 242 mates with fastener 244.

In some embodiments, apparatus 200 includes a plurality of securement to substantially prevent separation of a lengthwise seam of first fasteners 232 and 234 in apparatus 200. In the exemplary embodiment, cavities 260 created in apparatus 200 enable apparatus 200 to be substantially secured around duct 102 by the use of fiberglass cloth laces threaded through cavities 260. In one embodiment, grommets 262 are positioned within cavities 260 to substantially prevent tearing of apparatus 200 by fiberglass cloth laces. Alternatively, a plurality of securement can be any manner that prevents separation of a lengthwise seam of first fasteners 232 and 234 including, but not limited to, mechanical fasteners, wire laces, capstans or a combination thereof.

Figure 4:
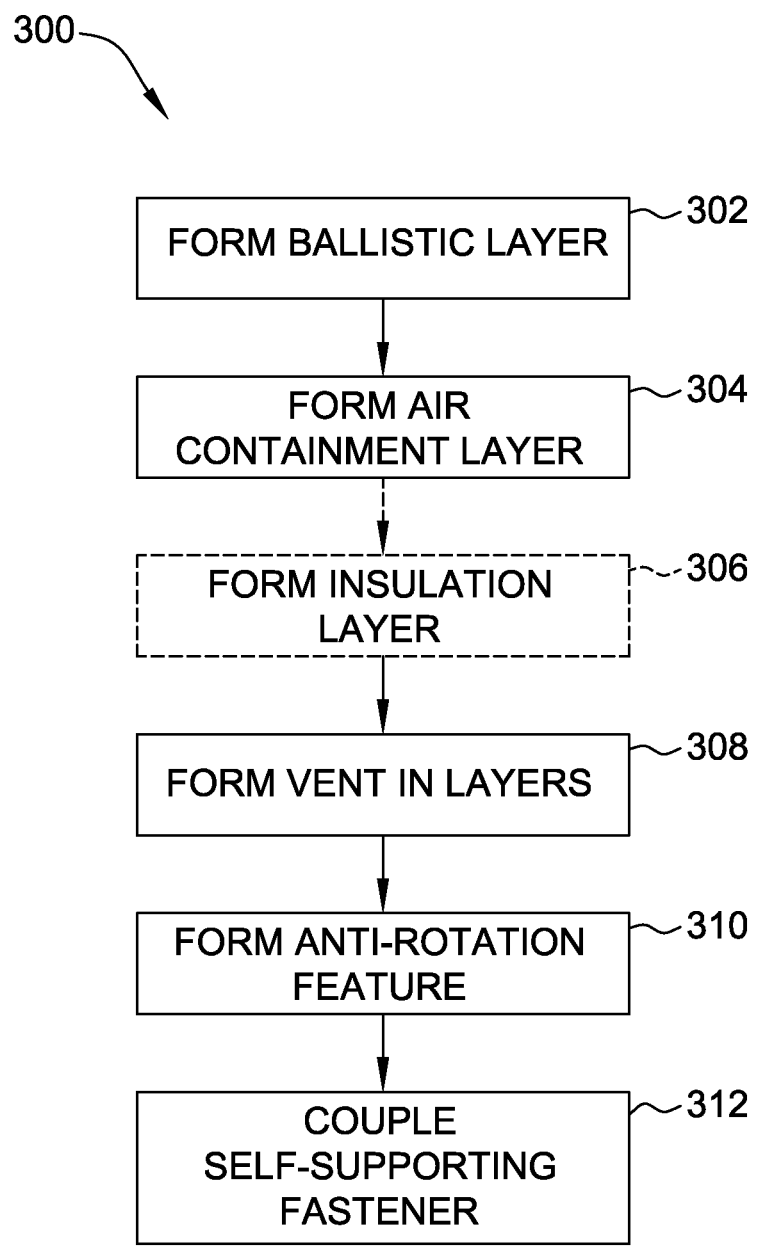
FIG. 4 is a flowchart of an exemplary method of fabricating the apparatus shown in FIG. 2.

FIG. 4 is a flowchart of an exemplary method 300 of fabricating apparatus 200. Method 300 includes forming 302 ballistic containment layer 202 and forming 304 air containment layer 204 that substantially surrounds ballistic containment layer 202. In some embodiments, insulation layer 206 is formed 306 in apparatus 200 such that layer 206 is configured to contact duct 102. In one embodiment, insulation layer 206 is formed 306 to be integrated within at least one of ballistic layer 202 and/or air containment layer 204. Vent 210 is formed 308 in layers 202, 204, and 206. In the exemplary embodiment, anti-rotation feature 224 is formed 310 within apparatus 200 such that feature 224 enables retention of tab 226. Method 300 also includes coupling 312 at least one a self-supporting fastener 230 and 240 to apparatus 200.

The embodiments described herein enable structures of a vehicle to be protected from explosions, fragments, and/or bursts that may occur within ducts of the vehicle. The embodiments described herein also provide a cost effective system for protecting a vehicle from irreparable harm by eliminating the need for a structural shielding systems that can be cumbersome, heavy, and costly to manufacture and maintain. Although the embodiments described above are described in relation to a vehicle, the embodiments may be implemented in stationary applications such as buildings having heat sensitive structures.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for directing flow discharged from a facture in a duct, said apparatus comprising:
   a ballistic containment layer extending along an outer surface of the duct, said ballistic containment layer surrounding the outer surface of the duct such that a cavity is defined therebetween;
   an air containment layer substantially surrounding said ballistic containment layer and extending along said ballistic containment layer;
   a plurality of vents formed by respective aligned openings in said ballistic containment layer and said air containment layer, wherein a flow channel is defined by said cavity and said respective aligned openings, said plurality of vents configured to direct a flow discharged from the duct fracture and channeled towards said plurality of vents along said flow channel; and
   a plurality of vent covers pivotally coupled to said air containment layer, wherein each vent cover of said plurality of vent covers is configured to releasably cover an associated vent of said plurality of vents.

2. The apparatus according to claim 1, further comprising an insulation layer configured to contact the duct.

3. The apparatus according to claim 2, wherein said insulation layer is integrated within said ballistic containment layer.

4. The apparatus according to claim 1, further comprising at least one anti-rotation feature configured to retain a tab therein coupled to the duct.

5. The apparatus according to claim 1, further comprising a self-supporting fastener coupled to said air containment layer.

6. The apparatus according to claim 1, wherein said ballistic layer comprises at least one of a ceramic fiber, a para-aramid fiber, and a carbon fiber.

7. The apparatus according to claim 1, further comprising a sensor positioned adjacent to said vent.

8. The apparatus according to claim 7, wherein said vent is configured to direct flow discharged from the duct fracture towards said sensor.

9. The apparatus according to claim 1, further comprising a vent closure releasably coupled to said air containment layer.

10. A duct protection system for a vehicle for directing flow discharged from a facture in a duct, said system comprising:
    a duct configured to channel flow through the vehicle; and
    a duct burst apparatus comprising:
       a ballistic containment layer extending along an outer surface of the duct, said ballistic containment layer surrounding the outer surface of the duct such that a cavity is defined therebetween, wherein said ballistic containment layer includes a first opening;
       an air containment layer substantially surrounding said ballistic containment layer, wherein said air containment layer includes a second opening configured to be aligned with said first opening;
       a vent defined through said ballistic containment layer and said air containment layer by aligned said first opening and said second opening, wherein said first and said second openings extend only partially about a circumference of said ballistic containment layer and said air containment layer, wherein a flow channel is defined by said cavity and said vent, said vent configured to direct a flow discharged from the duct fracture and channeled towards said vent along said flow channel; and
       a vent cover pivotally coupled to said air containment layer.

11. The duct protection system according to claim 10, wherein said duct is positioned adjacent to a fuel tank.

12. The duct protection system according to claim 10, wherein said duct burst apparatus further comprises an insulation layer configured to contact said duct.

13. The duct protection system according to claim 12, wherein said insulation layer is integrated with at least one of said ballistic containment layer and said air containment layer.

14. The duct protection system according to claim 10, wherein said ballistic containment layer includes at least one of a ceramic fiber, a para-aramid fiber, and a carbon fiber.

15. The duct protection system according to claim 10, wherein said duct burst apparatus further comprises a sensor positioned adjacent to said vent.

16. The duct protection system according to claim 15, wherein said sensor is at least one of a thermal sensor, a chemical sensor, a flow sensor, and a strain gauge.

17. A method of fabricating an apparatus for directing flow discharged from a facture in a duct, said method comprising:
    forming a ballistic containment layer configured to extend along at least a portion of an outer surface of the duct, the ballistic containment layer surrounding the outer surface of the duct such that a cavity is defined therebetween;
    forming an air containment layer that substantially surrounds the ballistic containment layer and configured to extend along the ballistic containment layer;
    forming aligned openings in the ballistic containment layer and the air containment layer to define a vent extending therethrough, wherein the openings extend only partially about a circumference of the ballistic containment layer and the air containment layer, wherein a flow channel is defined by the cavity and the vent, the vent configured to direct a flow discharged from the duct fracture and channeled towards the vent along the flow channel; and pivotally coupling a vent cover to the air containment layer.

18. The method according to claim 17, further comprising forming an insulation layer that is configured to contact the duct.

19. The method according to claim 17, further comprising forming an anti-rotation feature that is configured to retain a tab coupled therein to the duct.

20. The method according to claim 17, further comprising coupling a self-supporting fastener to the air containment layer.

\* \* \* \* \*